(12) United States Patent
Tsukui

(10) Patent No.: US 9,660,300 B2
(45) Date of Patent: May 23, 2017

(54) METHOD FOR MANUFACTURING SEALED BATTERY

(71) Applicant: Akira Tsukui, Toyota (JP)

(72) Inventor: Akira Tsukui, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 211 days.

(21) Appl. No.: 14/198,136

(22) Filed: Mar. 5, 2014

(65) Prior Publication Data

US 2014/0283371 A1    Sep. 25, 2014

(30) Foreign Application Priority Data

Mar. 21, 2013    (JP) .................. 2013-058696

(51) Int. Cl.
*H01M 6/14* (2006.01)
*H01M 10/42* (2006.01)

(52) U.S. Cl.
CPC ... *H01M 10/4228* (2013.01); *Y10T 29/49004* (2015.01)

(58) Field of Classification Search
CPC ............. H01M 10/052; H01M 10/0567
See application file for complete search history.

(56) References Cited

U.S. PATENT DOCUMENTS

| | | | | |
|---|---|---|---|---|
| 4,200,683 A * | 4/1980 | Bant | ......................... | H01M 4/22 205/63 |
| 4,934,046 A * | 6/1990 | Sindorf | ................... | H01M 2/06 29/623.1 |
| 5,580,675 A * | 12/1996 | Rouhani | ................ | H01M 10/48 429/90 |
| 5,645,953 A * | 7/1997 | Kim | ....................... | H01M 10/42 429/101 |
| 6,387,561 B1 * | 5/2002 | Nemoto | ................. | H01M 2/361 429/51 |
| 6,593,026 B1 * | 7/2003 | Tukawaki | ............... | H01M 2/36 429/185 |
| 7,150,936 B2 * | 12/2006 | Tukawaki | ............... | H01M 2/36 429/90 |
| 2006/0260713 A1 | 11/2006 | Pyszczek et al. | | |
| 2014/0248528 A1 * | 9/2014 | Takahata | ................ | H01M 4/133 429/156 |
| 2015/0255832 A1 * | 9/2015 | Tsukui | ................... | H01M 10/04 29/623.2 |
| 2015/0263376 A1 * | 9/2015 | Kondo | .............. | H01M 10/0431 429/94 |

FOREIGN PATENT DOCUMENTS

| | | |
|---|---|---|
| CN | 1350336 A | 5/2002 |
| JP | A-2002-117901 | 4/2002 |
| JP | A-2007-173063 | 7/2007 |

\* cited by examiner

*Primary Examiner* — Minh Trinh
(74) *Attorney, Agent, or Firm* — Oliff PLC

(57) ABSTRACT

A method for manufacturing a sealed battery includes: injecting an electrolytic solution into an exterior; introducing a detection gas into the exterior; and detecting a leakage by detecting a leakage of the detection gas introduced into the exterior, the electrolytic solution in an electrolytic solution tank is pressure fed into the exterior by pressurizing the electrolytic solution tank by feeding a gas of a kind the same as the detection gas in the electrolytic solution tank where the electrolytic solution is stored, in order to inject the electrolytic solution into the battery container.

3 Claims, 14 Drawing Sheets

US 9,660,300 B2

METHOD FOR MANUFACTURING SEALED BATTERY

INCORPORATION BY REFERENCE

The disclosure of Japanese Patent Application No. 2013-058696 filed on Mar. 21, 2013 including the specification, drawings and abstract is incorporated herein by reference in its entirety.

BACKGROUND OF THE INVENTION

1. Field of the Invention

The present invention relates to a method for manufacturing a sealed battery, which includes a liquid injection step of injecting an electrolytic solution in a battery container, an introduction step of introducing a detection gas into the battery container, and a leakage detection step of detecting a leakage of the detection gas introduced into the battery container.

2. Description of Related Art

A sealed battery is manufactured in some cases in such a manner that an electrode body formed by laminating or winding a positive electrode, a negative electrode and a separator is housed in a battery container, an electrolytic solution is injected in the battery container, thereafter the battery container is sealed. The electrode body becomes an electric power generating element when the electrolytic solution infiltrates in the electrode body. As a measure of injecting the electrolytic solution in the manufacturing processes of such a sealed battery, there is a technique disclosed in Japanese Patent Application Publication No. 2007-173063 (JP 2007-173063 A) or the like.

According to the technique disclosed in JP 2007-173063 A, an electrolytic solution is injected with an electrolytic solution tank, a syringe, and a liquid injection nozzle. The electrolytic solution tank stores the electrolytic solution and is connected with the syringe through an electrolytic solution feeding pipe. The syringe has an internal space as an electrolytic solution chamber and is connected with the liquid injection nozzle. A joint part of the syringe and the liquid injection nozzle is opened or closed by a liquid injection valve. According to the technique disclosed in JP 2007-173063 A, the electrolytic solution tank is pressurized by nitrogen, and the electrolytic solution is pressure-fed to the electrolytic solution chamber in the syringe. At this time, according to the technique disclosed in JP 2007-173063 A, the liquid injection valve closes between the electrolytic solution chamber and the liquid injection nozzle and the electrolytic solution is filled in the electrolytic solution chamber. Further, according to the technique disclosed in JP 2007-173063 A, the liquid injection valve is opened and the electrolytic solution is injected from the electrolytic solution chamber.

In the manufacturing process of the sealed battery, in order to prevent moisture from intruding into the battery container and degrading battery performance, a leakage detection step of detecting a leakage is performed after the battery container was sealed. In the leakage detection step, for example, the inside of the chamber that houses the battery container is evacuated and a helium amount leaked from a detection region (an internal space of the battery container) per unit time is measured using a helium leakage detector. In the leakage detection step, the measurement result, that is, an output value of the helium leakage detector and a detection threshold value M1 (see FIG. 14) are compared and the sealing property of the battery container is confirmed.

The technique disclosed in JP 2007-173063 A uses nitrogen to pressure feed the electrolytic solution, and accordingly, an abundant amount of nitrogen is present in the internal space of the electrolytic solution tank. Thus, nitrogen mainly dissolves in the electrolytic solution stored in the electrolytic solution tank. In other words, as shown in FIG. 12, when the liquid injection step is performed using the technique disclosed in JP 2007-173063 A, the electrolytic solution containing nitrogen is injected in the battery container.

As shown in FIG. 13, the nitrogen contained in the electrolytic solution diffuses into the detection region when the electrolytic solution infiltrates into the electrode body, and a helium concentration in the detection region is diluted thereby (see $N_2$ shown with a two-dot chain line in FIG. 3). Accordingly, when the electrolytic solution is injected by the technique disclosed in JP 2007-173063 A, after the battery container is sealed, the helium concentration in the detection region decreases due to diffusion of nitrogen. That is to say, according to the technique disclosed in JP 2007-173063 A, the helium concentration of the detection region cannot be maintained until the leakage detection step, as a result thereof, the helium concentration of the detection region during the leakage detection step decreases.

In this case, since a time interval from a time when the battery container is sealed to a time when the leakage detection step is performed varies, the helium concentration in the detection region during the leakage detection step fluctuates (see a graph of the related technique shown in FIG. 11). Therefore, when the helium concentration in the detection region largely decreases due to an influence of the fluctuation of the helium concentration as shown on a graph G11 in FIG. 14, an amount of helium that leaks per unit time decreases, resulting in a small value as a whole.

As is shown in FIG. 14, the detection threshold value M1 of the leakage detection step is set by considering a case where the helium concentration in the detection region is low like this. That is to say, as the detection threshold value M1, an output value of the helium leakage detector is set when a leakage amount of helium per unit time becomes a specified value N in the case where the helium concentration of the detection region during the leakage detection step has the minimum value. Thus, in the case where the helium concentration of the detection region is higher than the minimum value of the helium concentration due to an influence of fluctuation of the helium concentration when a battery container of which leakage amount N0 of helium per unit time is slightly less than the specified amount N is inspected, the output value of the helium leakage detector may exceed the detection threshold value M1 at a relatively high rate (see a point and a graph G12 shown in FIG. 14).

That is to say, in the case where the electrolytic solution was injected using the technique disclosed in JP 2007-173063 A, it was likely that good items were erroneously determined as defective items at a relatively high rate (see a region R11 of erroneous determination shown in FIG. 14). In other words, when the electrolytic solution was injected using the technique disclosed in JP 2007-173063 A, it was likely that the determination rate in the leakage detection step was degraded.

SUMMARY OF THE INVENTION

The present invention provides a method for manufacturing a sealed battery, which can reduce an erroneous determination rate in a leakage detection step.

An aspect of a method for manufacturing a sealed battery according to the present invention includes the steps of:
injecting an electrolytic solution into a battery container;
introducing a detection gas into the battery container;
inspecting by detecting a leakage of the detection gas introduced into the battery container; and
in order to inject the electrolytic solution into the battery container, pressure-feeding the electrolytic solution in a storage device by pressurizing the storage device by feeding a pressure feeding gas to the storage device where the electrolytic solution is stored;
in which as the pressure feeding gas, a gas of the same kind as the detection gas is used.

The present invention achieves an effect that an erroneous determination rate in the leakage detection step can be reduced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, a method for manufacturing a sealed battery (hereinafter, simply referred to as "manufacturing method") according to an embodiment.

First, a rough structure of a battery that is an embodiment of a sealed battery according to the present invention will be described.

A battery 10 of the embodiment is a sealed lithium ion secondary battery. Incidentally, a target to which the present invention is applied is not limited to the lithium ion secondary battery but includes other sealed battery such as a nickel hydrogen secondary battery.

Figure 1:
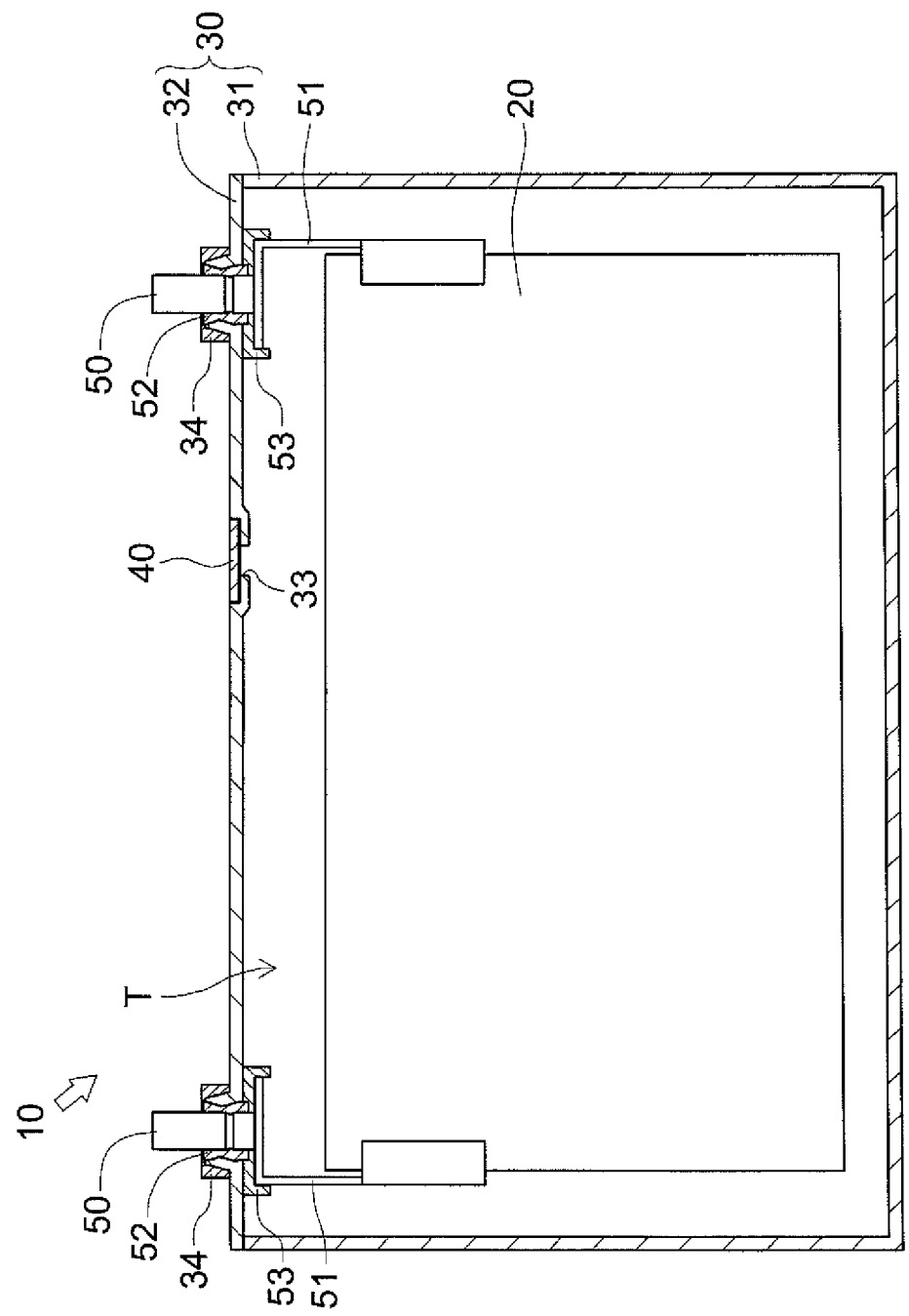
FIG. 1 is an explanatory diagram that shows an entire structure of a battery.

As shown in FIG. 1, the battery 10 includes an electric power generating element 20, an exterior 30, a cap 40, and external terminals 50 and 50.

Figure 2:
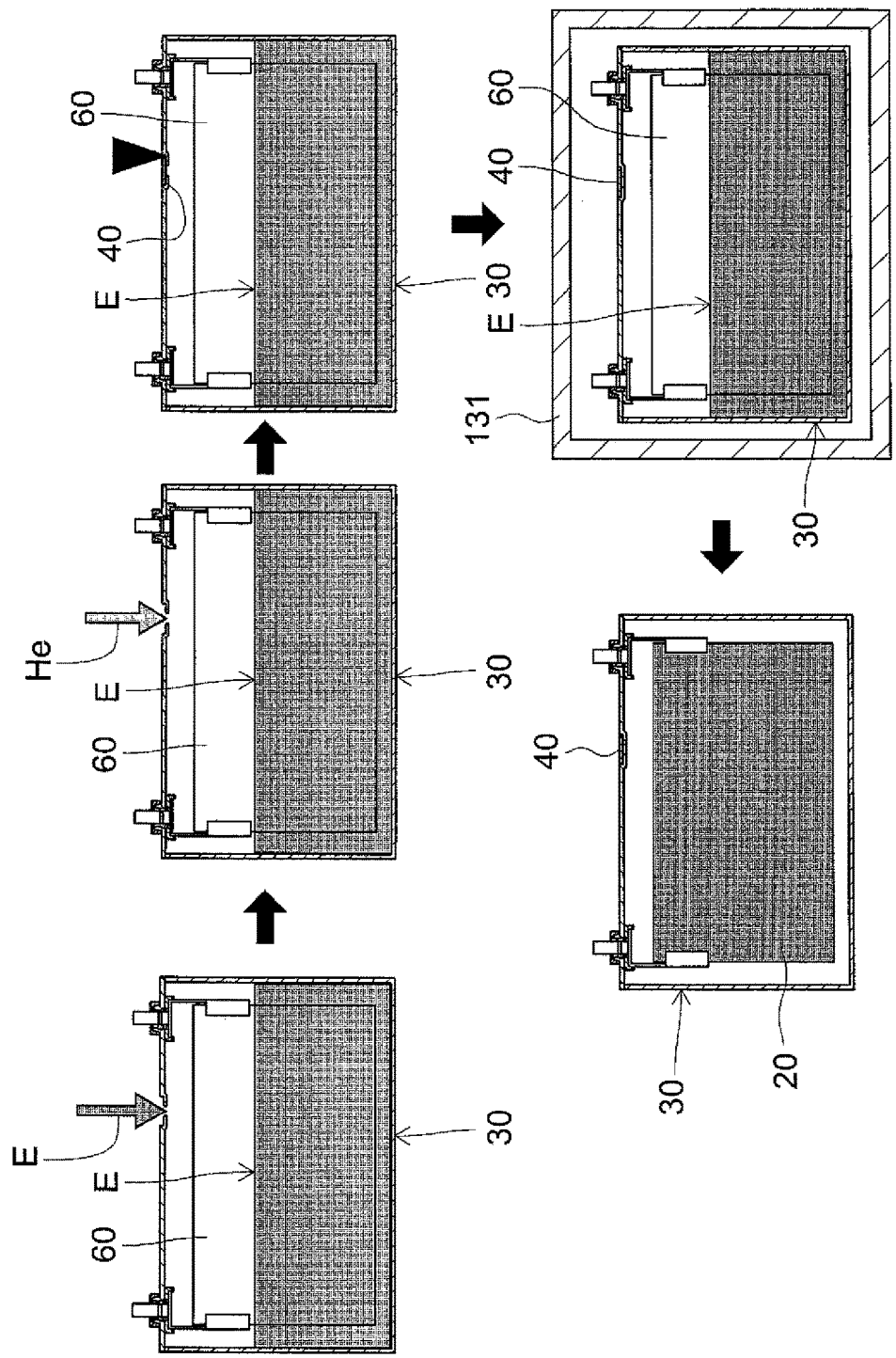
FIG. 2 is an explanatory diagram that shows a production process of a battery.

The electric power generating element 20 is formed by infiltrating an electrolytic solution E into an electrode body 60 obtained by laminating or winding a positive electrode, a negative electrode, and a separator (see FIG. 2). During charge of the battery 10, a chemical reaction occurs in the electric power generating element 20 (strictly speaking, an ion migration occurs through the electrolytic solution E between the positive electrode and negative electrode) and a current flow is generated.

The exterior 30 that is a battery container is a rectangular columnar canister that has a housing part 31 and a cap part 32.

The housing part 31 is a bottomed rectangular prismatic member having one opened plane and houses the electric power generating element 20 therein.

The cap part 32 is a tabular member having a shape in accordance with an opening face of the housing part 31 and joined with the housing part 31 in a state where the opening face of the housing part 31 is closed. In the cap part 32, as described below, between positions where the external terminals 50 and 50 are inserted, a liquid injection port 33 for injecting the electrolytic solution E is opened.

The liquid injection port 33 is a roughly circular hole in plan view, in which an inner diameter dimension is different between the outside and the inside of the cap part 32. The liquid injection port 33 is formed with an upper (outside) inner diameter larger than a lower (inside) inner diameter.

Incidentally, the battery of the embodiment is formed into a rectangular battery in which the exterior is formed into a bottomed rectangular prism. However, without limiting thereto, the battery of the embodiment can be applied to a cylindrical battery in which the exterior is formed into a bottomed cylinder, for example.

The cap 40 seals the liquid injection port 33. The cap 40 is formed into a shape of the substantially same as that of the upper side of the liquid injection port 33. The cap 40 is placed under the liquid injection port 33 and an outer periphery part thereof is joined with a cap part 32 by laser welding.

Each of the external terminals 50 and 50 is disposed in a state where a part thereof is projected from an outside face of the cap part 32 to the upper side (outward) of the battery 10. Each of the external terminals 50 and 50 is electrically connected to the positive electrode or negative electrode of the electric power generating element 20 through one of current collector terminals 51 and 51. Each of the external terminals 50 and 50 is fixed, by fitting a fixing member 34 into an outer periphery face part thereof, in an insulating state with respect to the cap part 32 with insulation members 52 and 53 inserted therebetween. The external terminals 50 and 50 and the current collector terminals 51 and 51 work as an energizing path that takes out an electric power stored in the electric power generating element 20 to the outside or takes in external electric power into the electric power generating element 20. Each of the current collector terminals 51 and 51 is connected to a positive electrode plate or a negative electrode plate of the electric power generating element 20. As a material for the current collector terminals 51 and 51, for example, aluminum can be employed on a positive electrode side, and copper can be employed on a negative electrode side.

A site of each of the external terminals 50 and 50, which protrudes outward of the battery 10 is processed by thread rolling and a bolt part is formed. During actual use of the battery 10, connection terminals of a bus bar and an external terminal of an external device are fastened and fixed to the external terminals 50 and 50 by means of the bolt part. Upon fastening and fixing, a fastening torque is applied on the external terminals 50 and 50, at the same time, an external force in an axial direction is applied by screw fastening. Thus, as a material for the external terminals 50 and 50, a high strength material such as iron is preferably used.

Next, a manufacturing method according to an embodiment will be described.

According to the manufacturing method, a mixture (a positive electrode mixture and a negative electrode mixture) is coated on a surface of a current collector (a positive electrode current collector and a negative electrode current collector) using a coating machine such as a die coater, and then the mixture is dried. According to the manufacturing method, a mixture layer (a positive electrode mixture layer and a negative electrode mixture layer) is formed on a surface of the current collector by applying press working on the mixture on the surface of the current collector.

According to the manufacturing method, the positive electrode and the negative electrode manufactured through such a process, and a separator are laminated or wound to form an electrode body 60 (see FIG. 2). Subsequently, in the manufacturing method, the external terminals 50 and 50 and current collector terminals 51 and 51 integrated on the cap part 32 of the exterior 30 are connected to the electrode body 60, and the electrode body 60 is housed in a housing part 31 of the exterior 30. Thereafter, according to the manufacturing method, the housing part 31 of the exterior 30 and the cap part 32 are joined and sealed by welding.

As shown in FIG. 2, after the exterior 30 is sealed, the injecting step of injecting an electrolytic solution E in the exterior 30 (in the battery container) from the liquid injection port 33 is performed in the manufacturing method (see an arrow shown in FIG. 2). A procedure of the liquid injection step will be described in detail below.

After the electrolytic solution E was injected in the exterior 30, the introducing step of introducing helium He in the exterior 30 from the liquid injection port 33 is performed (see an arrow He shown in FIG. 2). According to the manufacturing method, for example, the introducing step is performed in such a manner that a nozzle that is connected to a specified helium supply source and can inject helium He is inserted in the liquid injection port 33, and helium He is injected from the nozzle.

A measure of performing the introducing step is not limited thereto. That is to say, the introducing step may be performed in such a manner that the exterior is housed in a chamber, and, after the inside of the chamber is evacuated, helium is introduced into the chamber.

After helium He was introduced into the exterior 30, the liquid injection port 33 is sealed with the cap 40 according to the manufacturing method. At this time, the cap 40 is placed on the liquid injection port 33, a laser is irradiated along an outer periphery part of the cap 40 by a laser welder, and the liquid injection port 33 is sealed (see a black triangle shown in FIG. 2).

After the liquid injection port 33 was sealed, according to the manufacturing method, the leakage detection step of detecting a leakage of He introduced in the detection region T (that is, a degree of sealing of the exterior 30) is performed. At this time, the exterior 30 is housed in the chamber 131, and the inside of the chamber 131 is evacuated. Thereafter, according to the manufacturing method, an amount of He that leaks from an internal space (hereinafter indicated as "detection region T", see FIG. 1) of the exterior 30 per unit time is checked with a commercially available helium leakage detector.

Then, according to the manufacturing method, whether there is a leakage in the exterior 30 or not is determined based on an output value of the helium leakage detector. That is, according to the manufacturing method, when an output value of the helium leakage detector is smaller than a detection threshold M2 (see FIG. 9), the exterior 30 is determined as free from leakage, and, when an output value of the helium leakage detector is the detection threshold value M2 or more, the exterior 30 is determined as having a leakage. Thus, in the embodiment, a detection gas for determining the leakage of the exterior 30 is helium He.

Incidentally, the detection gas is not limited to helium like the embodiment. However, helium may be used. This is because when He is used, an advantageous effect can be obtained in the manufacturing process of a battery compared with other detection gas such that battery performances can be prevented from being influenced, and since a molecular diameter of helium is small, a leakage from a fine hole can be detected. Further, according to the manufacturing method, when helium is introduced, a mixed gas obtained by mixing helium and other gas than helium may be introduced.

After the leakage detection step is performed, an initial charge and a detection of voltage of the battery 10 are performed in the manufacturing method. According to the manufacturing method, a sealed battery 10 is thus manufactured.

Subsequently, a procedure of the liquid injection step will be described.

Figure 3:
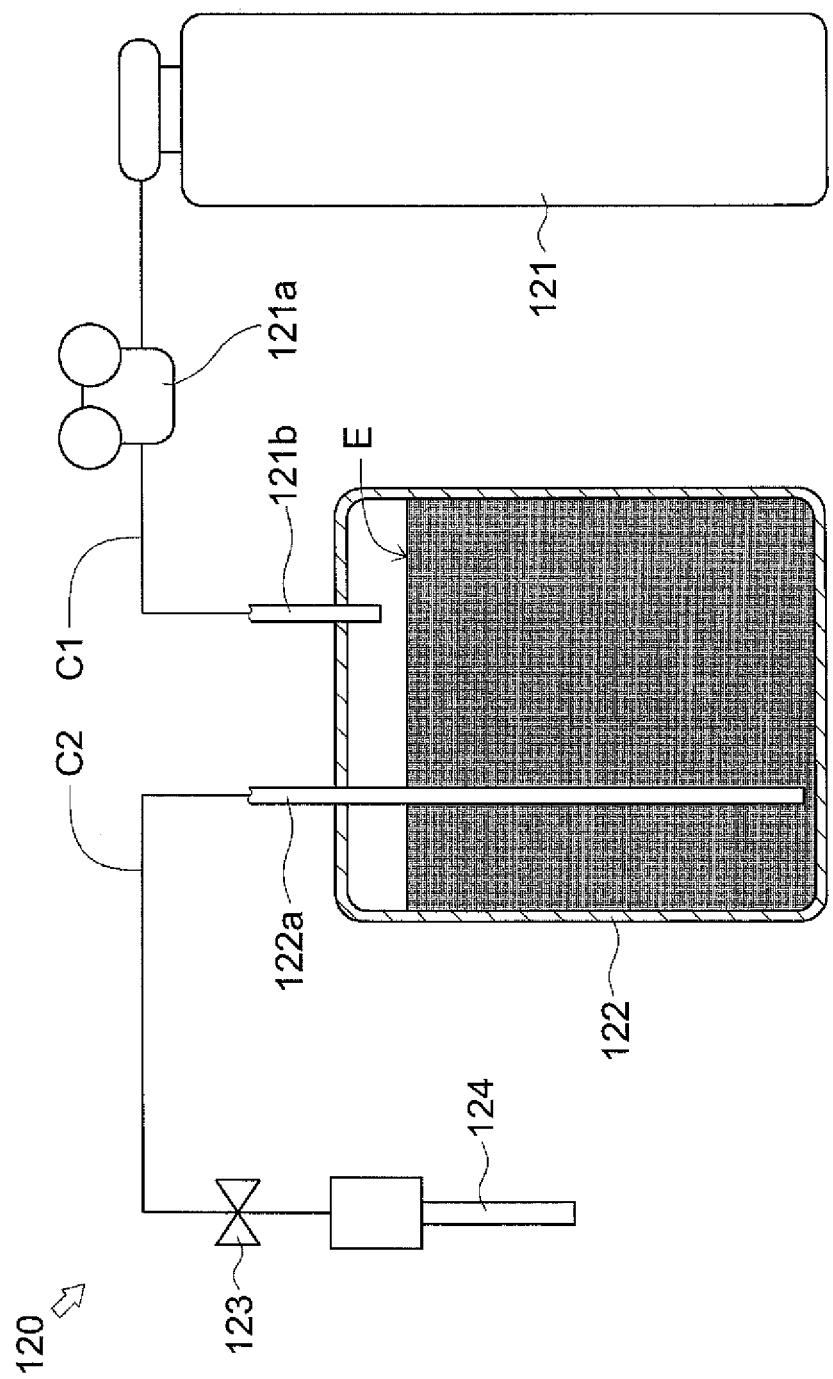
FIG. 3 is an explanatory diagram that shows a liquid injection unit.

First, a structure of a liquid injection unit 120 used in the liquid injection step will be described with reference to FIG. 3.

The liquid injection unit 120 includes a helium feed source 121, an electrolytic solution tank 122, a valve 123, and a liquid injection nozzle 124.

The helium feed source 121 stores high-pressure helium. The helium feed source 121 is connected to the electrolytic solution tank 122 through a regulator 121a and a helium feed pipe 121b. One end part of the helium feed pipe 121b is located at a position higher than a liquid surface of the electrolytic solution tank 122, in more detail, in the proximity of an upper surface of the electrolytic solution tank 122. The other end part of the helium feed pipe 121b is located outside of the electrolytic solution tank 122. The helium feed source 121 feeds helium He that is adjusted to a specified pressure by the regulator 121a to the electrolytic solution tank 122.

In other words, the liquid injection unit 120 includes a helium feed path C1 that feeds helium He in the helium feed source 121 to the electrolytic solution tank 122.

The electrolytic solution tank 122 stores the electrolytic solution E in a sealed state. The electrolytic solution tank 122 is connected to the liquid injection nozzle 124 through the electrolytic solution feed pipe 122a and the valve 123. The electrolytic solution tank 122 is pressurized by feeding helium He from the helium feed source 121. One end part of the electrolytic solution feed pipe 122a is extended to a position lower than a liquid surface of the electrolytic solution tank 122, in more detail, to the proximity of a bottom surface of the electrolytic solution tank 122. The other end part of the electrolytic solution feed pipe 122a is located outside of the electrolytic solution tank 122.

That is to say, the liquid injection unit 120 is formed such that the electrolytic solution E in the electrolytic solution tank 122 can be pressure fed from one end part of the electrolytic solution feed pipe 122a toward the liquid injection nozzle 124. Thus, the liquid injection unit 120 includes an electrolytic solution feed path C2 that feeds the electrolytic solution E of the electrolytic solution tank 122 to the liquid injection nozzle 124.

The valve 123 is disposed on the electrolytic solution feed path C2 and opens or closes the electrolytic solution feed path C2.

The liquid injection nozzle 124 is disposed above the liquid injection port 33 (see FIG. 4), joined with a rod of a cylinder, for example, and can be elevated.

The liquid injection unit 120 structured like this is installed in equipment that is under atmospheric pressure, for example.

In the liquid injection step, using such a liquid injection unit 120, the electrolytic solution E is injected into the exterior 30 as shown below. Incidentally, in the liquid injection step, the valve 123 is closed.

Figure 4:
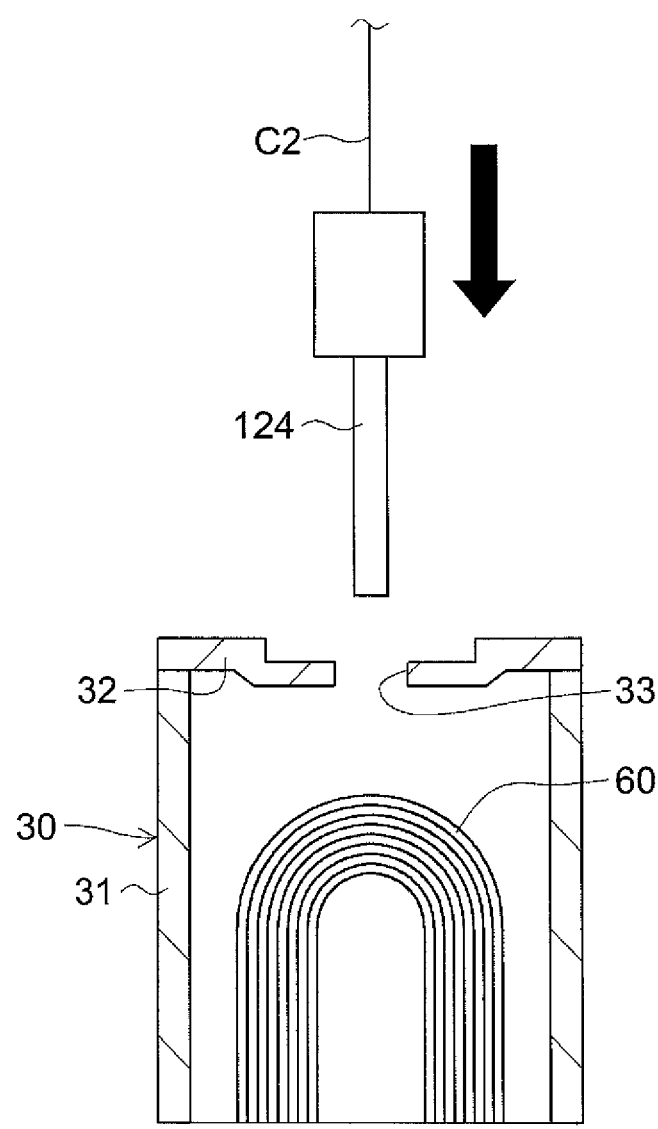
FIG. 4 is an explanatory diagram that shows a situation where a liquid injection nozzle is set.

First, as shown in FIG. 4, according to the manufacturing method, the liquid injection nozzle 124 is set to the exterior 30. That is to say, according to the manufacturing method, the liquid injection nozzle 124 is lowered and an injection port of the liquid injection nozzle 124, that is, a lower end part is inserted into the liquid injection port 33 (see an arrow shown in FIG. 4). At this time, the exterior 30 is in a state where internal pressure is not adjusted, that is, under atmospheric pressure.

Figure 5:
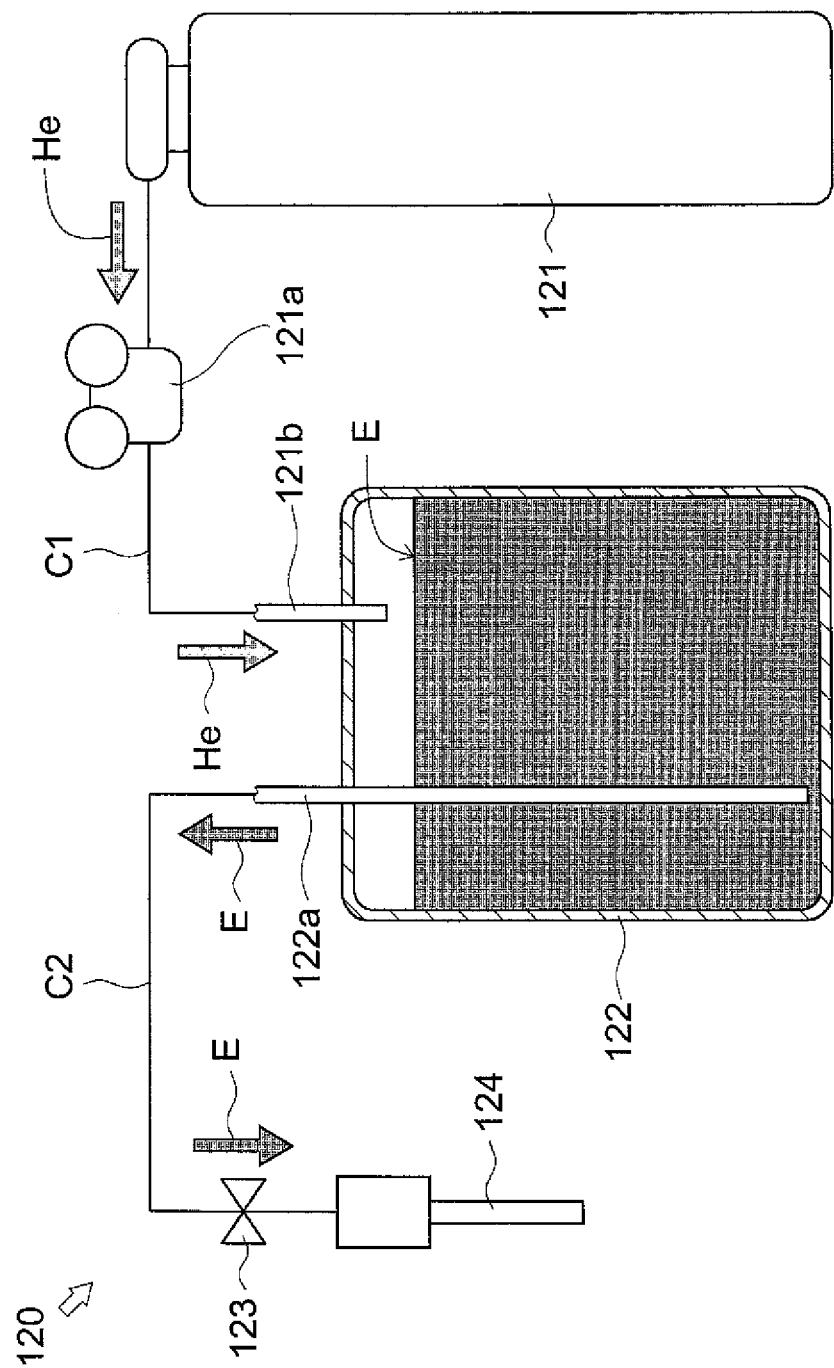
FIG. 5 is an explanatory diagram that shows a situation where an electrolytic solution is pressure-fed with helium.
Figure 6:
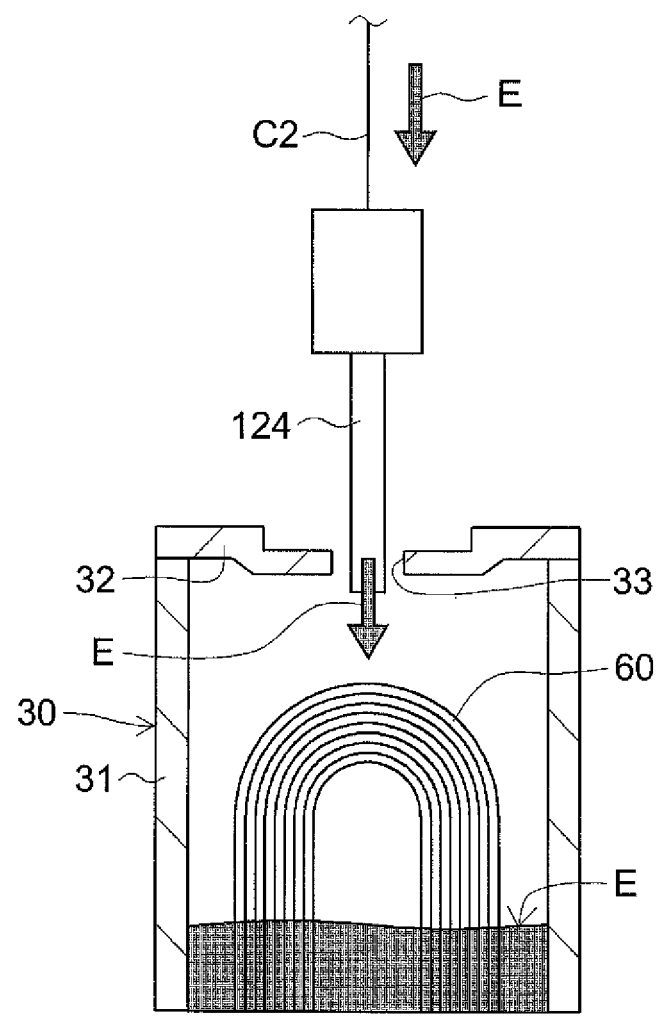
FIG. 6 is an explanatory diagram that shows a situation where the electrolytic solution is injected into an exterior.

As shown in FIG. 5 and FIG. 6, after the liquid injection nozzle 124 is set, according to the manufacturing method, the electrolytic solution E is injected into the exterior 30. That is to say, according to the manufacturing method, the valve 123 is controlled to open the electrolytic solution feed path C2. Thus, the electrolytic solution E is pressure fed from the electrolytic solution tank 122 pressurized by helium He toward the liquid injection nozzle 124 in the manufacturing method (see helium He and electrolytic solution E shown in FIG. 5).

The electrolytic solution E that is pressure fed to the liquid injection nozzle 124 is discharged from an injection port of the liquid injection nozzle 124 into the exterior 30 (see electrolytic solution E shown in FIG. 6).

After a constant amount of the electrolytic solution E is injected, according to the manufacturing method, the valve 123 is controlled to close the electrolytic solution feed path C2, and the liquid injection nozzle 124 is elevated to a position of a height before lowering. According to the manufacturing method, the liquid injection step is continually performed by carrying out a series of operations like this with respect to the exterior 30 transported by a specified transportation apparatus.

Thus, in the liquid injection step, the electrolytic solution E in the electrolytic solution tank 122 is pressure fed into the exterior 30 by feeding helium He to the electrolytic solution tank 122, and the electrolytic solution tank 122 is pressurized thereby. Accordingly, in the embodiment, a pressure-feeding gas for pressure feeding the electrolytic solution E is helium He. Further, the electrolytic solution tank 122 a liquid storage device for storing the electrolytic solution E.

Figure 12:
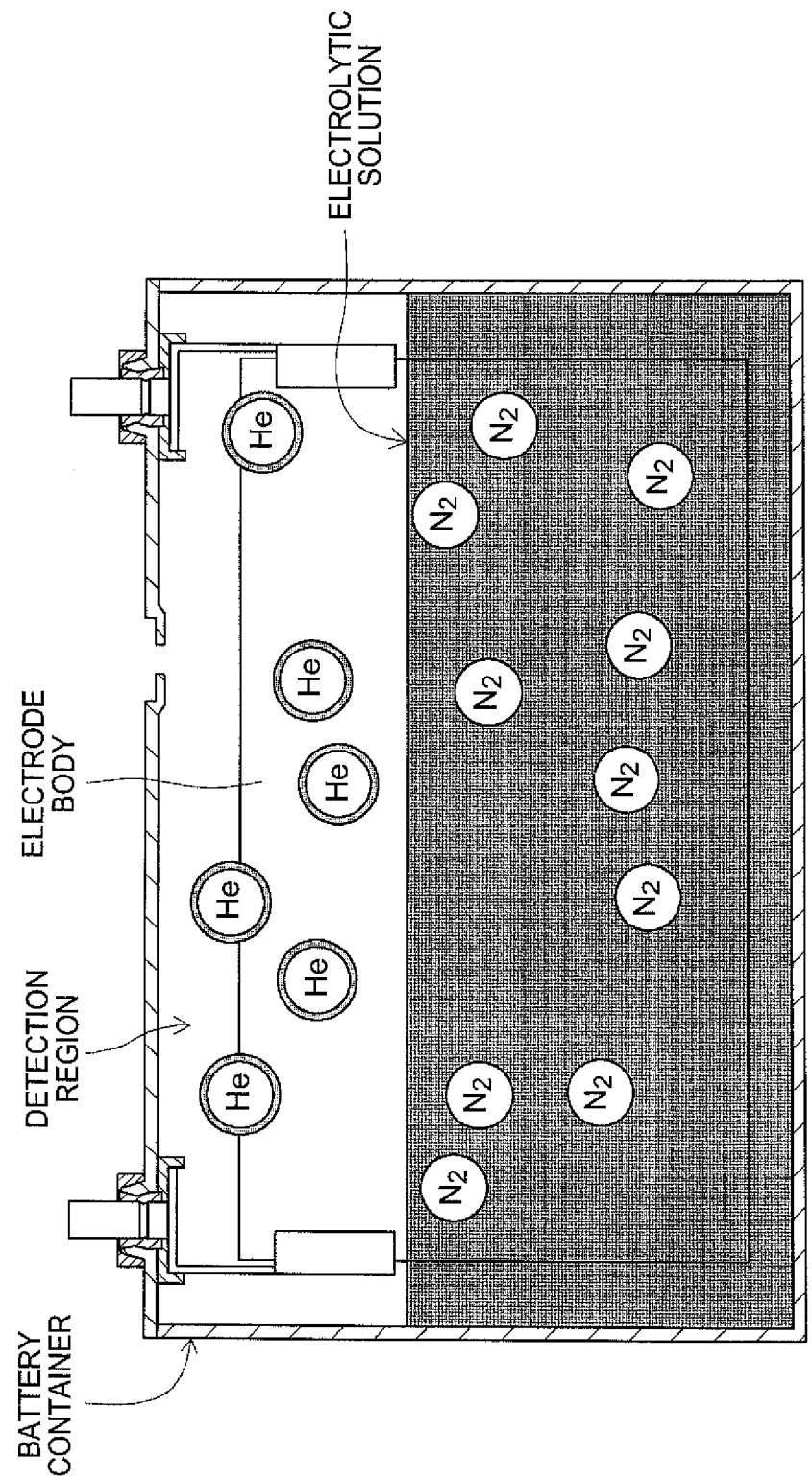
FIG. 12 is an explanatory diagram that shows the electrolytic solution in which nitrogen is mixed.

Herein, as the pressure feeding gas for pressure feeding the electrolytic solution E, from the viewpoint of being low cost and not affecting on battery performances, nitrogen is preferably used. In this case, nitrogen is abundantly present in an internal space of the electrolytic solution tank and mainly nitrogen dissolves in the electrolytic solution in the electrolytic solution tank. Consequently, in this case, an electrolytic solution containing nitrogen is injected to the exterior (see nitrogen $N_2$ shown in FIG. 12).

Figure 13:
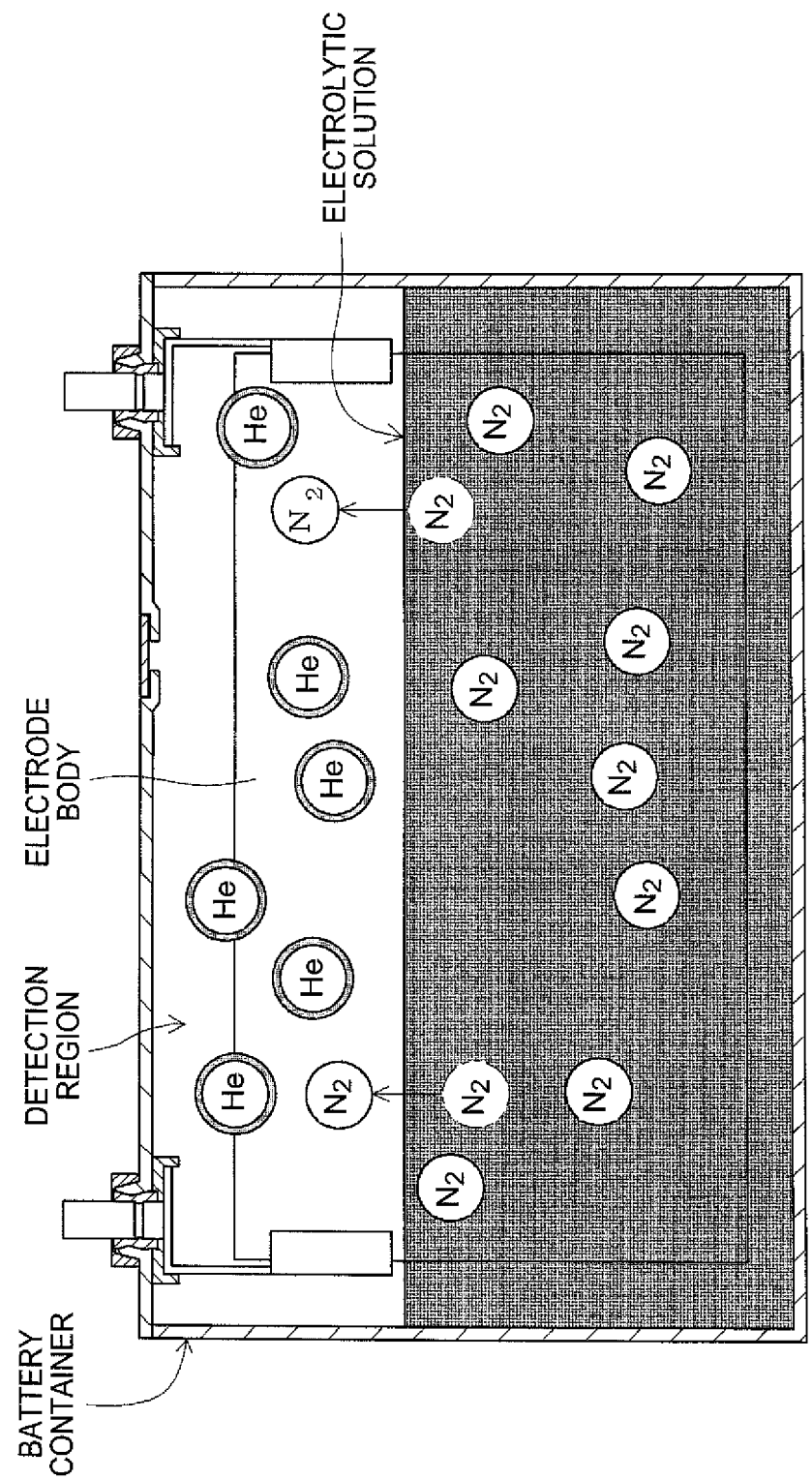
FIG. 13 is an explanatory diagram that shows a situation where nitrogen diffuses into the detection region after the battery container is sealed.

The electrolytic solution E injected into the exterior 30 infiltrates into the electrode body 60 as time goes along. When the electrolytic solution containing nitrogen was injected, during infiltration of the electrolytic solution, nitrogen diffuses into the detection region and a helium concentration in the detection region is diluted (see $N_2$ shown with a two-dot chain line in FIG. 13).

Figure 7:
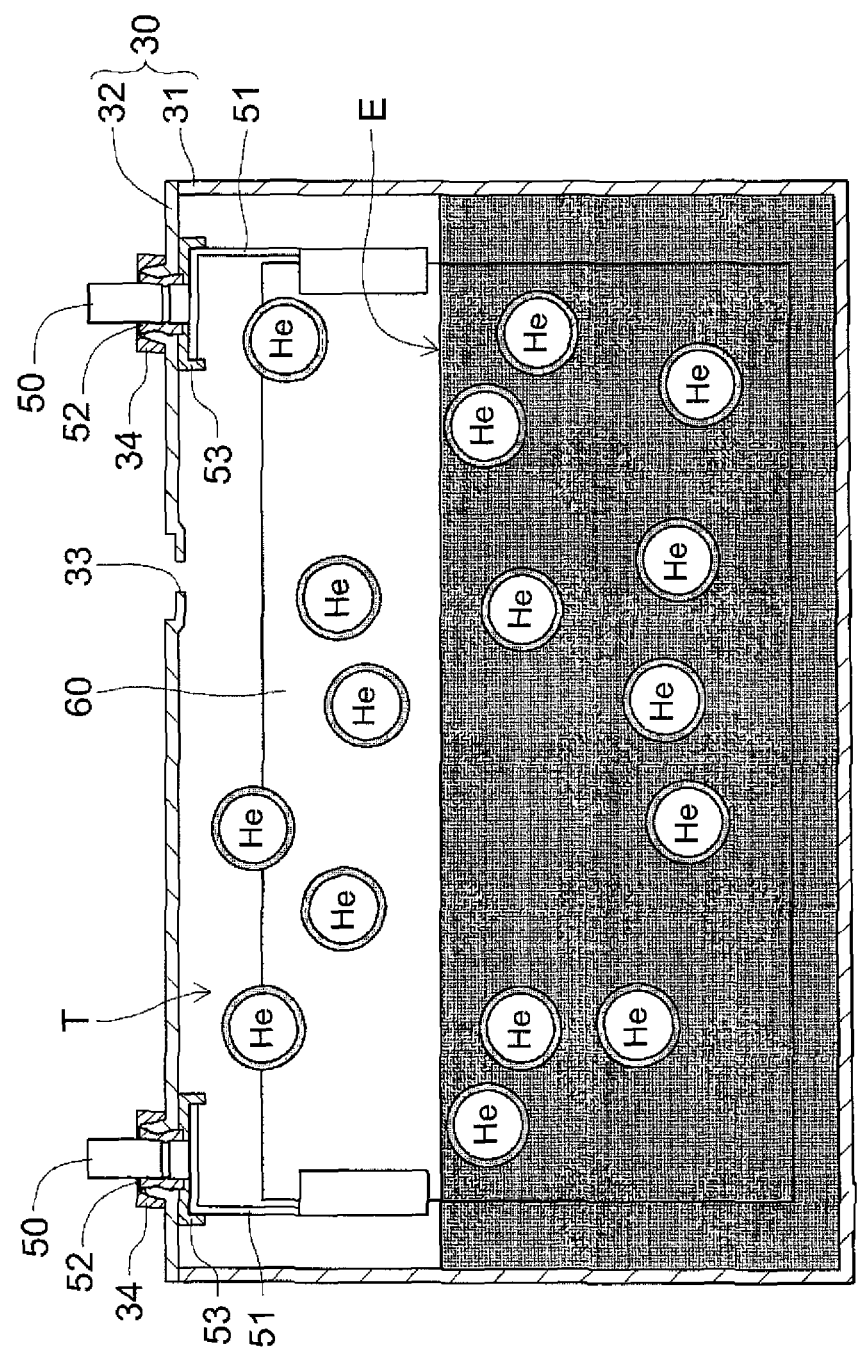
FIG. 7 is an explanatory diagram that shows the electrolytic solution in which helium is mixed.

Thus, according to the manufacturing method of the embodiment, helium He is employed as a pressure feeding gas for pressure feeding the electrolytic solution E. That is to say, as shown in FIG. 7, according to the manufacturing method of the embodiment, the electrolytic solution E in which helium He is intentionally mixed is injected into the exterior 30 (see helium He shown in FIG. 7).

Figure 8:
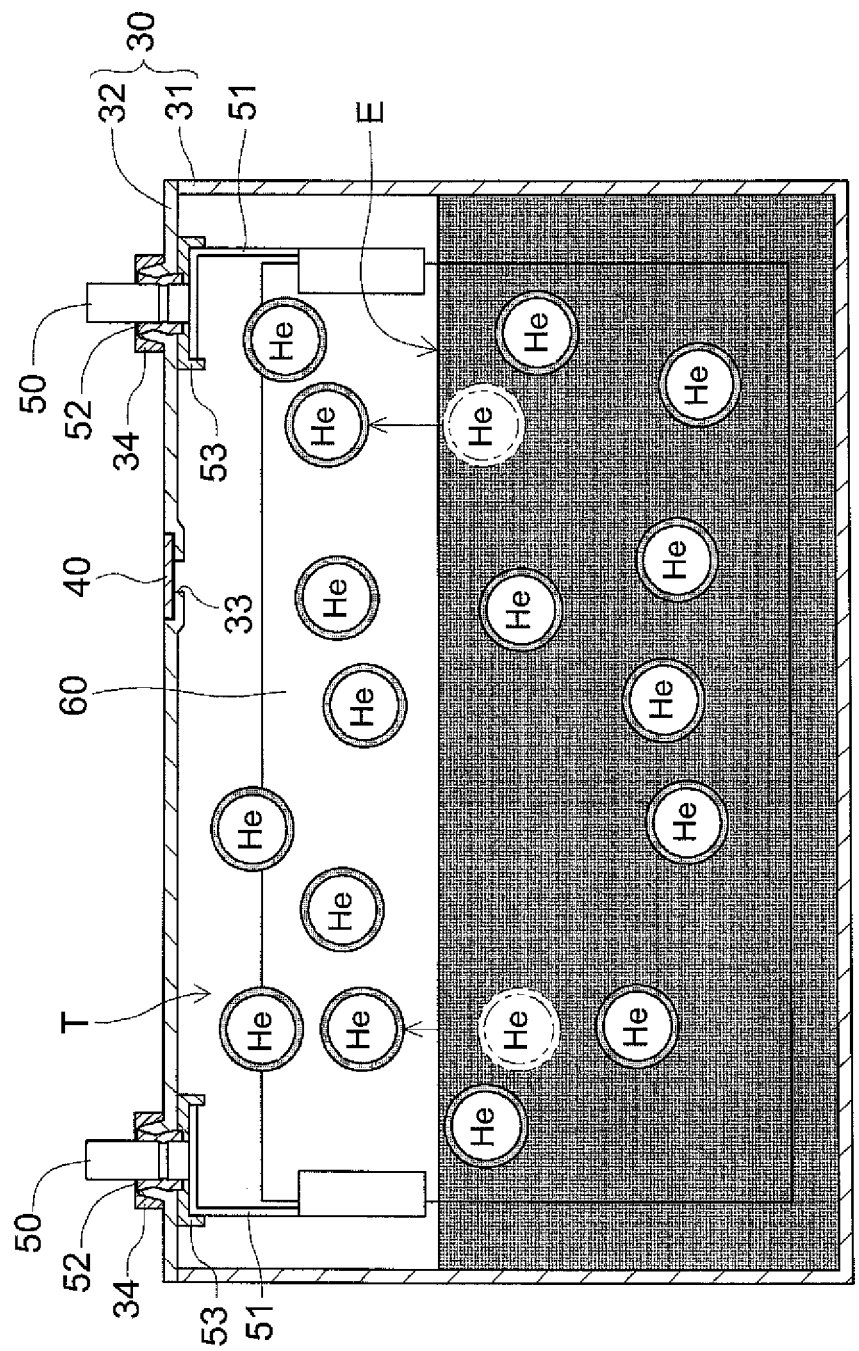
FIG. 8 is an explanatory diagram that shows a situation where helium diffuses into a detection region after a liquid injection port is sealed.

According to this, as shown in FIG. 8, the manufacturing method can diffuse helium He into the detection region T when the electrolytic solution E infiltrated into the electrode body 60 (see helium He shown with a two-dot chain line in FIG. 8). Therefore, the manufacturing method can suppress the helium concentration in the detection region T from decreasing even when the electrolytic solution E infiltrates into the electrode body 60 for a time period from sealing of the liquid injection port 33 to performing of the leakage detection step and the gas mixed in the electrolytic solution E diffuses into the detection region T. That is to say, the manufacturing method can maintain the helium concentration of the detection region T even when a degree of infiltration of the electrolytic solution proceeds and an abundant gas mixed in the electrolytic solution E diffuses into the detection region T.

Therefore, even when a time interval from a time when the liquid injection port 33 is sealed to a time when the leakage detection step is performed becomes longer, the leakage detection step can be applied to the exterior 30 of which the helium concentration in the detection region T is high to a certain degree. That is to say, according to the manufacturing method, the minimum value of the helium concentration in the detection region T during the leakage detection step can be raised in comparison with the related technique (a case where nitrogen is adopted as a pressure feeding gas).

According to this manufacturing method, an amount of helium He that leaks from the detection region T during the leakage detection step can be increased. Therefore, as shown in FIG. 9, according to the manufacturing method, an output value of the leakage detector can be raised (see an arrow shown in FIG. 9).

Figure 9:
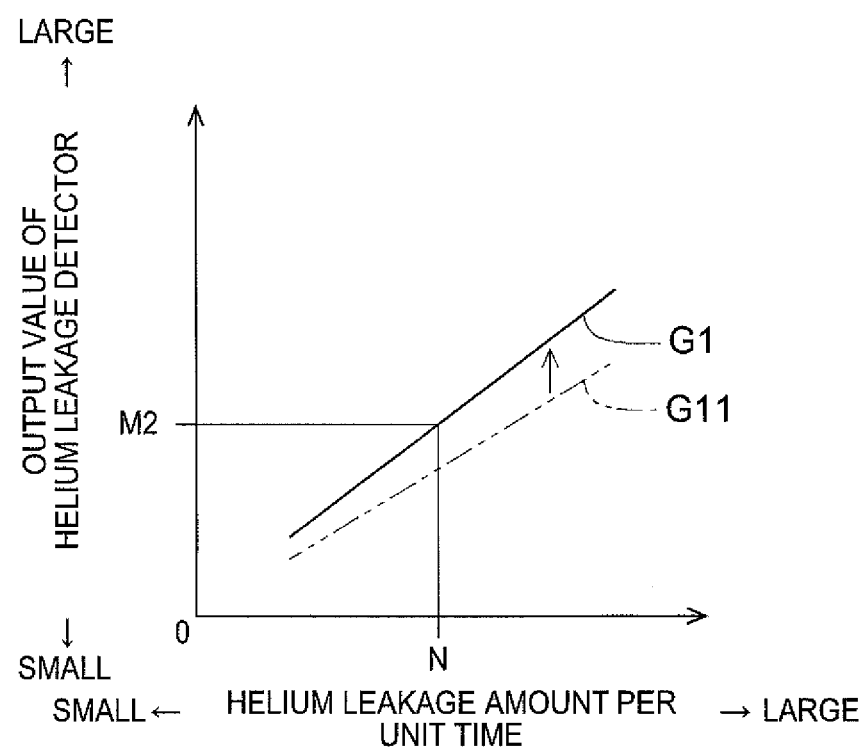
FIG. 9 is a diagram that shows a detection threshold value in a leakage detection step.

Incidentally, a graph G1 shown in FIG. 9 is a graph that shows a relationship between a leakage amount of helium He per unit time and an output value of the helium leakage detector when the helium concentration during the leakage detection step is a minimum value in the manufacturing method of the embodiment. Further, a graph G11 shown in FIG. 9 is a graph that shows a relationship between a leakage amount of helium He per unit time and an output value of the helium leakage detector when the helium concentration during the leakage detection step is a minimum value in the related art. In graphs G1 and G11 where a leakage amount of helium He per unit time is shown in a horizontal axis and an output value of the helium leakage detector is shown in a vertical axis like FIG. 9, the helium concentrations in the detection region T during the leakage detection step correspond to gradients of the graph G1 and G11.

The detection threshold value M2 is determined in consideration of such a case where the helium concentration in the detection region T during the leakage detection step is a minimum value. That is to say, as the detection threshold value M2, a value that can surely detect the exterior 30 in which the leakage occurs even when the helium concentration of the detection region T during the leakage detection step is a minimum value is set. Specifically, as the detection threshold value M2, an output value of the helium leakage detector where a leakage amount of helium He per unit time becomes a specified value N in the graph G1 in the case where the helium concentration in the detection region T during the leakage detection step is a minimum value is set.

That is to say, according to the manufacturing method, by raising the minimum value of the helium concentration in the detection region T during the leakage detection step, the output value of the helium leakage detector is raised, and the detection threshold value M2 during the leakage detection step is raised thereby. Therefore, the manufacturing method has high sensitivity in the leakage detection.

Further, the manufacturing method can prevent the helium concentration in the detection region T from fluctuating even when a degree of infiltration of the electrolytic solution E into the electrode body 60 fluctuates and an amount of a gas that diffuses into the detection region T fluctuates. That is to say, the manufacturing method can make a difference of the maximum value and the minimum value of the helium concentration in the detection region T during the leakage detection step smaller compared with the related art.

Figure 10:
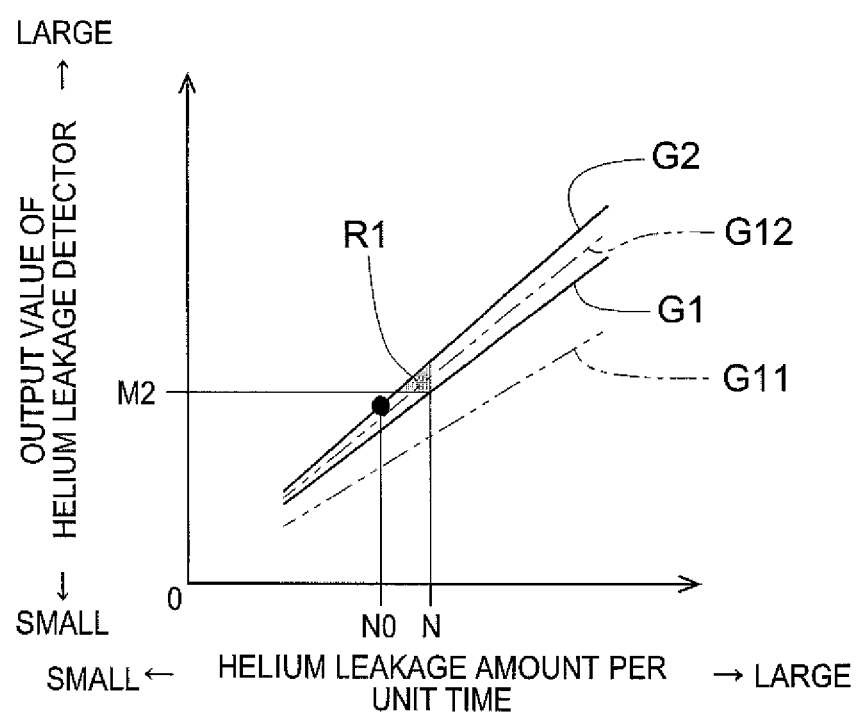
FIG. 10 is a diagram that shows a relationship between a leakage amount of helium per unit time and an output value of a helium leakage detector.

That is to say, the manufacturing method can stabilize an output value of the helium leakage detector even when a time interval from a time when the liquid injection port 33 is sealed to a time when the leakage detection step is performed fluctuates like graph G1 and G2 shown in FIG. 10.

Incidentally, a graph G2 shown in FIG. 10 is a graph that shows a relationship between a leakage amount of helium He per unit time and an output value of the helium leakage detector in the case where the helium concentration during the leakage detection step is a minimum value in the manufacturing method of the embodiment. Further, a graph G12 shown in FIG. 10 is a graph that shows a relationship between a leakage amount of helium He per unit time and an output value of the helium leakage detector when the helium concentration during the leakage detection step in the related technology is a maximum value.

Figure 14:
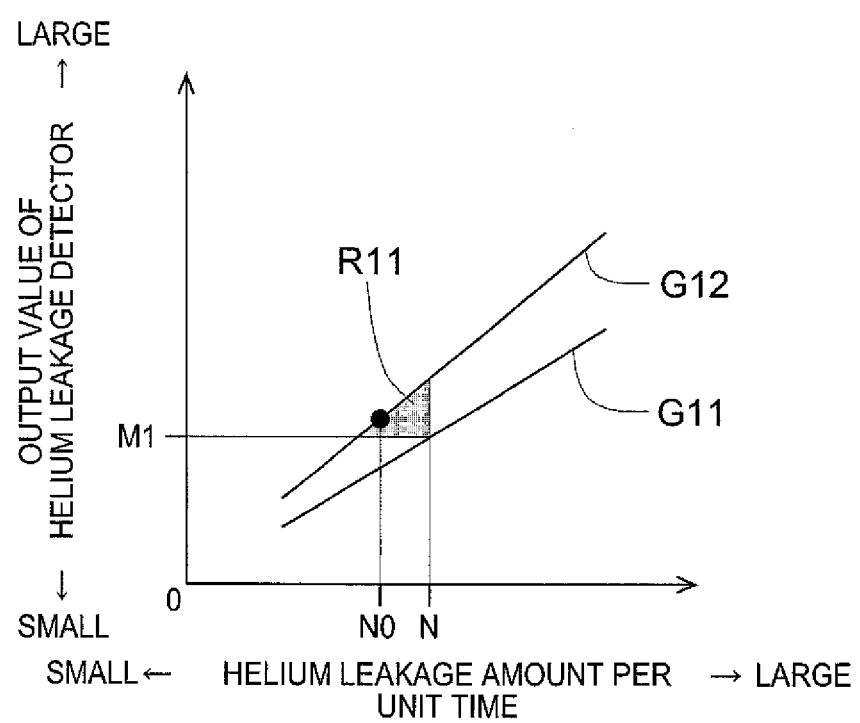
FIG. 14 is a diagram that shows a relationship between a leakage amount of helium per unit time and an output value of the helium leakage detector in the related art.

As shown in FIG. 10, the manufacturing method can prevent the output value of the helium leakage detector from exceeding the detection threshold value M2 at a relatively high rate by stabilizing the output value of the helium leakage detector even when the exterior 30 in which a leakage amount NO of helium per unit time is slightly smaller than a specified amount N that is NG by detection is inspected (see a point shown in FIG. 10). That is to say, the manufacturing method can reduce an erroneous determination rate in the leakage detection step since by employing helium He as a pressure feeding gas, the helium concentration in the detection region T when the electrolytic solution E infiltrates into the electrode body 60 can be prevented from decreasing (see regions R1 and R11 of erroneous determination in FIG. 10 and FIG. 14).

Further, the manufacturing method can prevent the helium concentration in the detection region T from decreasing without providing a deaerating device for deaerating a gas mixed in the electrolytic solution E on the electrolytic solution feed path C2.

Accordingly, the manufacturing method can reduce a cost and a space necessary for equipment that manufactures the battery 10.

Thus, the manufacturing method uses helium He, that is, a gas of the same kind as a detection gas as a pressure feeding gas for pressure feeding the electrolytic solution E. When a hydrogen gas is employed as a detection gas, in the manufacturing method, a hydrogen gas is used as a pressure feeding gas.

Next, measurement results of a relationship between the helium concentration in the detection region T and a lapse time after the liquid injection port 33 was sealed when the electrolytic solution E is injected using the manufacturing method of the embodiment will be described.

In the measurement, the exterior 30 in which the electrolytic solution E is injected using the manufacturing method of the embodiment was prepared as a test piece according to the invention. Further, in the measurement, a test piece for Comparative Example was prepared in such a manner that the electrolytic solution E was injected into the exterior 30 using nitrogen as a pressure feeding gas, and the liquid injection port 33 was sealed in the same procedure as the manufacturing method of the embodiment (see FIG. 12). In the test piece according to the invention and the test piece for Comparative Example, helium He was introduced into the exterior 30 such that the detection region T during introduction of helium had the same helium concentration with each other.

Figure 11:
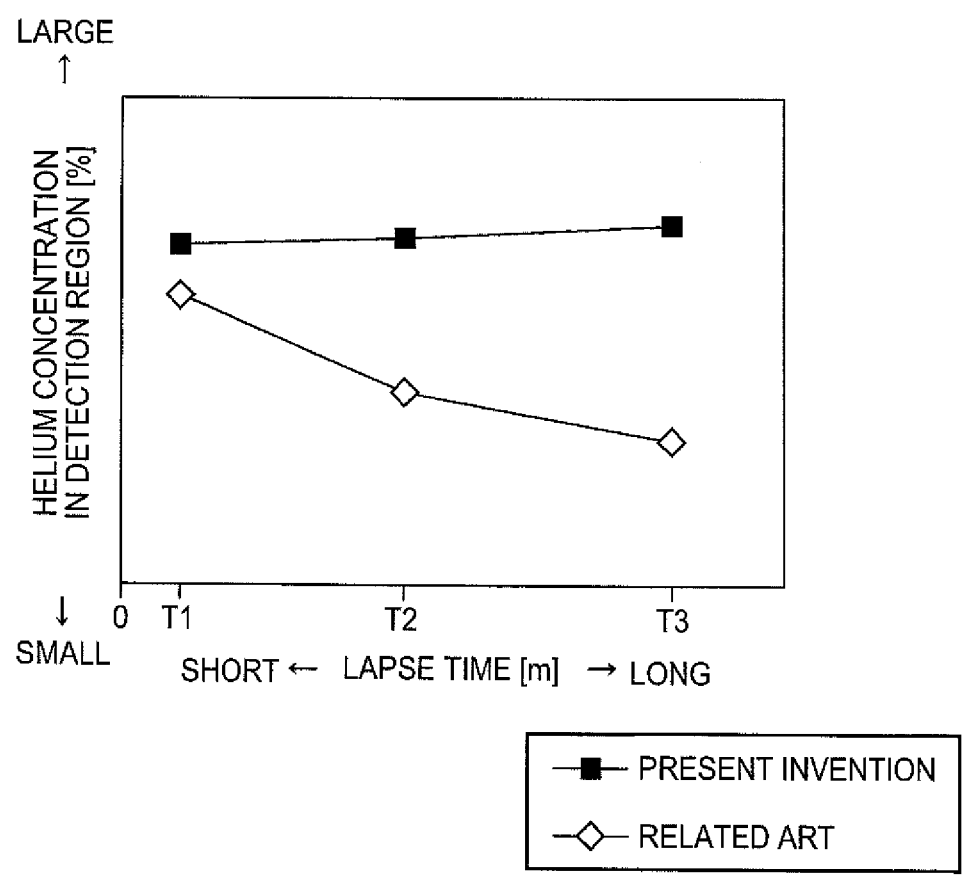
FIG. 11 is a diagram that shows a relationship between a lapse time after the liquid injection port was sealed and a helium concentration in the detection region.

In the measurement, the helium concentration was measured in such a manner that after each of the test pieces was left still for a constant time, a hole was formed in the exterior 30 and a head of the helium concentration meter was speedily pushed to the hole, and after a constant time, the helium concentration of the detection region T was measured. As shown in FIG. 11, in the measurement, a plurality of the respective test pieces were prepared, and by varying a standstill time, the helium concentration in the detection region T was measured.

In the test piece of Comparative Example, as the lapse time becomes longer, the helium concentration in the detection region T drastically decreases. This is because as time lapses, the electrolytic solution E infiltrates into the electrode body 60, and nitrogen mixed in the electrolytic solution E diffuses into the detection region T (see FIG. 13).

Thus, when a time interval from a time when the liquid injection port 33 is sealed to a time when the leakage detection step is performed fluctuates between a time T1 to time T3 in FIG. 11, the helium concentration during the leakage detection step largely fluctuates. That is to say, in this case, an erroneous determination may occur at a relatively high rate in the leakage detection step (see the region R11 of erroneous determination in FIG. 14).

On the other hand, in the test piece according to the invention, as a lapse time from a time when the liquid injection port 33 was sealed becomes longer, the helium concentration in the detection region T slightly increases. This is because as shown in FIG. 8, when the electrolytic solution E infiltrates into the electrode body 60 as a time lapses, helium He that is mixed in the electrolytic solution E is intentionally diffused to the detection region T.

Therefore, even when a time interval from a time when the liquid injection port 33 was sealed to a time when the leakage detection step is performed fluctuates between time T1 to time T3 in FIG. 11, according to the manufacturing method, the helium concentration during the leakage detection step does not largely fluctuate.

From the above, it is found that the manufacturing method can reduce an erroneous determination rate in the leakage detection step by using a gas of the same kind as an detection gas as a pressure feeding gas.

Incidentally, according to the manufacturing method of the embodiment, the introducing step is performed after the liquid injection step was performed. However, the manufacturing method is not limited thereto. In other words, in the manufacturing method according to the invention, the liquid injection step and the introducing step may simultaneously be performed.

According to the manufacturing method of the embodiment, the electrolytic solution is injected into the exterior which is under atmospheric pressure, the manufacturing method is not limited thereto. That is to say, according to the manufacturing method, the electrolytic solution may be pressure fed into the exterior using helium such that a liquid injection nozzle is placed inside the chamber, the exterior is housed in the chamber, the inside of the chamber is depressurized, after that, the valve is opened.

What is claimed is:

1. A method for manufacturing a sealed battery, the method comprising:

storing an electrolytic solution in a storage device in a sealed state;

feeding a pressurized feeding gas into the storage device where the electrolytic solution is stored;

after the electrolytic solution is stored in the storage device and the storage device is pressurized by feeding the pressurized feeding gas from a feeding gas feed source, injecting the electrolytic solution into a battery container via a liquid injection nozzle, the electrolytic solution being pressure fed from the storage device to the injection nozzle using the pressurized feeding gas;

introducing a detection gas into the battery container, the detection gas being identical to the pressurized feeding gas; and detecting a leakage of the detection gas introduced into the battery container.

2. The method for manufacturing a sealed battery according to claim 1, wherein the pressurized feeding gas and the detection gas contain helium.

3. The method for manufacturing a sealed battery according to claim 1, wherein the pressurized feeding gas and the detection gas contain hydrogen.

* * * * *